United States Patent [19]

Nagasaki et al.

[11] Patent Number: 5,180,764
[45] Date of Patent: Jan. 19, 1993

[54] STABILIZED POLYPROPYLENE RESIN COMPOSITIONS CONTAINING A DINITRODIAMINE COMPOUND

[75] Inventors: Hideo Nagasaki, Osaka; Naoki Inui, Yamatokoriyama; Shinichi Yachigo, Toyonaka; Hiroomi Abe; Takeshi Fujii, both of Chiba; Masashi Yamamoto, Ichihara, all of Japan

[73] Assignee: Sumitomo Chemical Company, Limited, Osaka, Japan

[21] Appl. No.: 681,363

[22] Filed: Apr. 8, 1991

[30] Foreign Application Priority Data

Apr. 9, 1990 [JP] Japan .................................. 2-94486
Apr. 9, 1990 [JP] Japan .................................. 2-94487

[51] Int. Cl.$^5$ ................................................ C08K 5/32
[52] U.S. Cl. ...................................................... 524/260
[58] Field of Search .......................................... 524/260

[56] References Cited

U.S. PATENT DOCUMENTS

| 5,017,663 | 5/1991 | Mizuno et al. | 525/397 |
| 5,019,615 | 5/1991 | Mizuno et al. | 524/260 |

FOREIGN PATENT DOCUMENTS

| 253365 | 7/1987 | European Pat. Off. |
| 0391733 | 10/1990 | European Pat. Off. |
| 0394016 | 10/1990 | European Pat. Off. |
| 9119762 | 12/1991 | World Int. Prop. O. |

Primary Examiner—Paul R. Michl
Assistant Examiner—Tae H. Yoon
Attorney, Agent, or Firm—Stevens, Davis, Miller & Mosher

[57] ABSTRACT

A thermoplastic resin is stabilized by incorporating therein a dinitrodiamine compound represented by the formula of

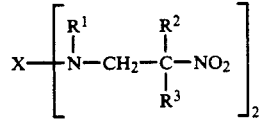

wherein X is a divalent aliphatic, alicyclic or aromatic group which may contain halogen or oxygen in the group, $R^1$ is hydrogen or an aliphatic, alicyclic or aromatic group, provided that two nitrogen atoms linking through X may further link through $R^1$ when both X and $R^1$ are the aliphatic groups, and $R^2$ and $R^3$ independently of one another are each hydrogen or an alkyl of 1 to 12 carbon atoms, provided that $R^2$ and $R^3$ may conjointly form a ring. The composition thus blended is improved in thermal processing stability. Further, a modified polyolefin resin is improved in mechanical properties, particularly in impact strength, by the incorporation of the dinitrodiamine compound.

10 Claims, No Drawings

STABILIZED POLYPROPYLENE RESIN COMPOSITIONS CONTAINING A DINITRODIAMINE COMPOUND

The present invention relates to a thermoplastic resin composition and more particularly, to a thermoplastic resin composition excellent in thermal processing stability at high temperature molding.

Thermoplastic resins are generally liable to undergo deterioration by heat or shearing at the time of processing and are decomposed or crosslinked (gelation) due to the deterioration, resulting in reduction of processability and besides much reduction in commercial properties. Hitherto, in order to inhibit the thermal deterioration at processing, a phenolic antioxidant such as pentaerythrityl tetrakis[3-(3,5-di-t-butyl-4-hydroxyphenyl)-propionate] or octadecyl 3-(3,5-di-t-butyl-4-hydroxyphenyl)propionate has been used each alone or in combination with other antioxidants.

Recently, however, various engineering plastics and other thermoplastic resins having high melting temperatures at processing are widely used, and even the usual thermoplastic resins tend to be molded at a higher temperature than ever for improvement of productivity. Thus, inhibition of thermal deterioration from the thermoplastic resins at high-temperature molding becomes more necessary than ever.

On the other hand, among thermoplastic resins, polyolefin resins such as polypropylene and polyethylene are widely used in a variety of industrial fields, since they have various superior physical properties and superior processability and besides, are inexpensive.

However, because the polyolefin resins are nonpolar, they are inferior in adhesiveness and affinity to metals, glasses and polar polymer materials and are difficult to be formed into composites with these materials. Therefore, it has been well known to introduce a polar group into such polyolefin resins by grafting, for example, unsaturated carboxylic acids or derivatives thereof such as acrylic acid and maleic anhydride on the polyolefin resins to modify them.

However, these modified polyolefin resins have the problems in that they are low in mechanical strength, especially in impact strength and their uses are restricted.

One of the object of the present invention is to improve thermal processing stability of thermoplastic resins in their molding at high temperatures.

Another object of the present invention is to improve mechanical properties, especially impact strength of thermoplastic resins, especially modified polyolefin resins.

Thus, the present invention provides a thermoplastic resin composition comprising a thermoplastic resin and a dinitrodiamine compound represented by the following formula:

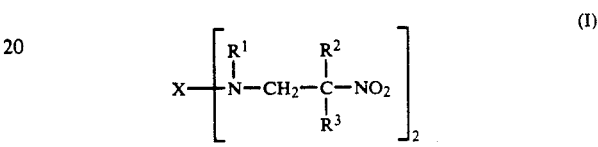

wherein X is a divalent aliphatic, alicyclic or aromatic group which may contain halogen or oxygen in the group, $R^1$ is hydrogen or an aliphatic, alicyclic or aromatic group, provided that two nitrogen atoms linking through X may further link through $R^1$ when both X and $R^1$ are the aliphatic groups, and $R^2$ and $R^3$ independently of one another are each hydrogen or an alkyl of 1 to 12 carbon atoms, provided that $R^2$ and $R^3$ may conjointly form a ring. Thermal processing stability of the thermoplastic resins can be improved by incorporation of the above-mentioned specific dinitrodiamine compound. Furthermore, when the thermoplastic resins are the modified polyolefin resins, impact strength can be improved by incorporation of the specific dinitrodiamine compound.

As the dinitrodiamine compounds used here, the following can be exemplified. In the following examples, -Z denotes

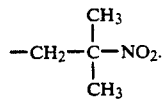

 (1)

 (2)

 (3)

 (4)

 (5)

 (6)

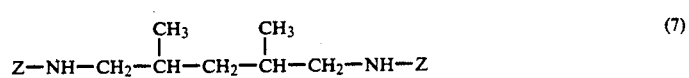 (7)

 (8)

 (9)

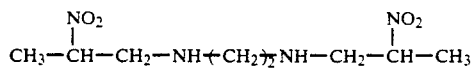 (10)
 (11)
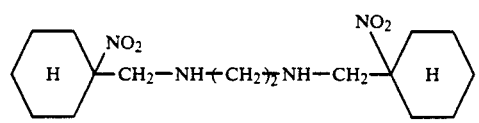 (12)
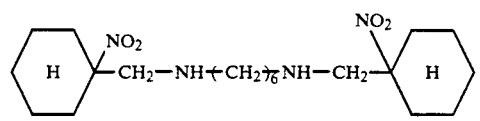 (13)
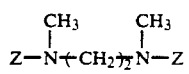 (14)
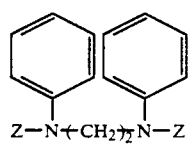 (15)
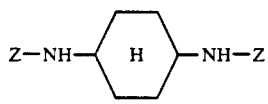 (16)
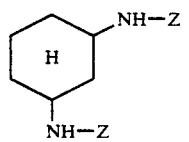 (17)
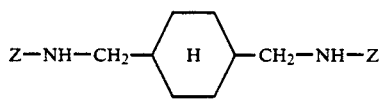 (18)
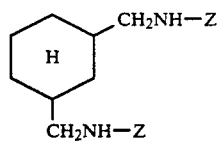 (19)
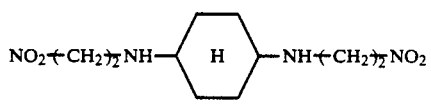 (20)
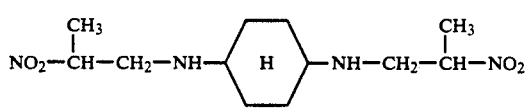 (21)
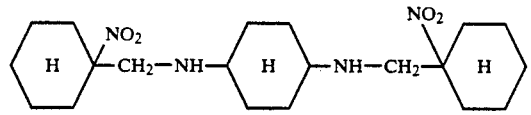 (22)

-continued
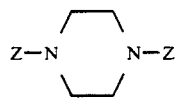 (23)
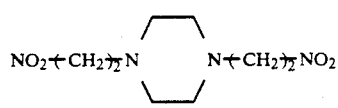 (24)
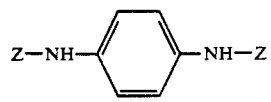 (25)
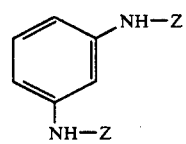 (26)
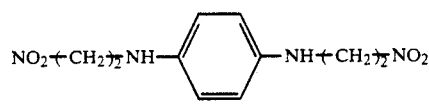 (27)
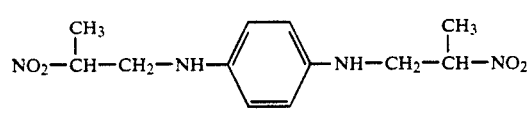 (28)
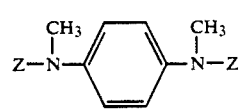 (29)
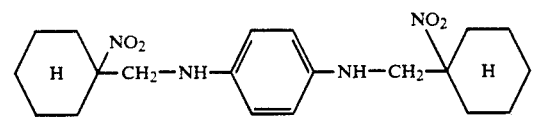 (30)
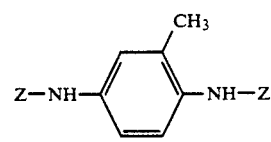 (31)
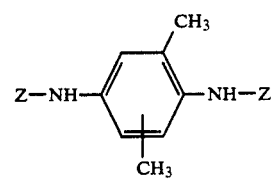 (32)
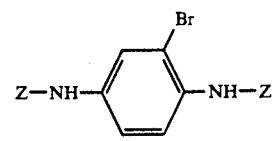 (33)
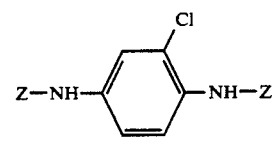 (34)

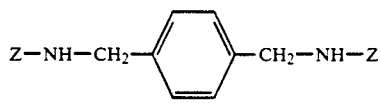
(35)
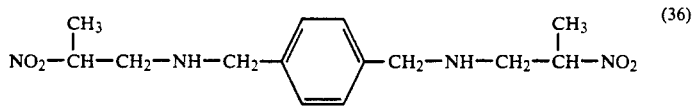
(36)
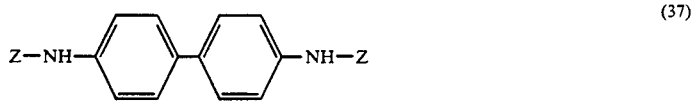
(37)
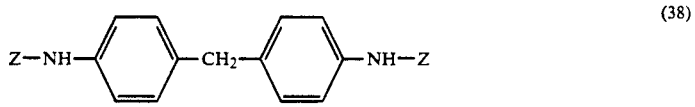
(38)
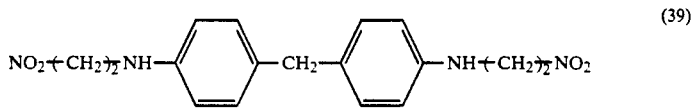
(39)
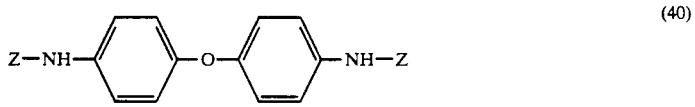
(40)
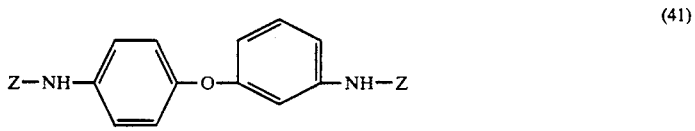
(41)
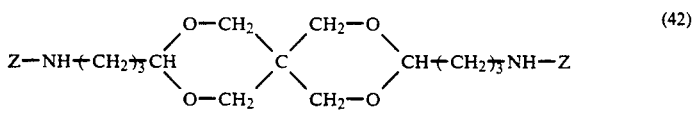
(42)
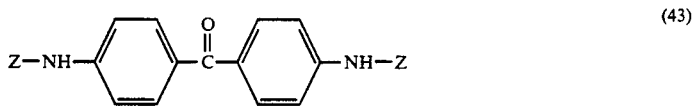
(43)
(44)
(45)
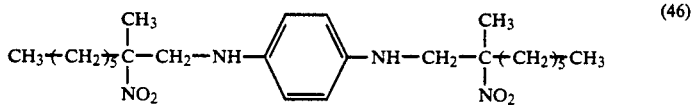
(46)
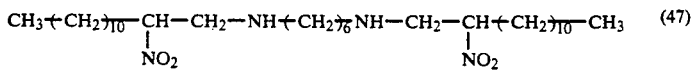
(47)

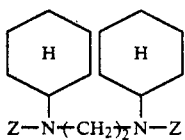

As exemplified above, the bridging group X in the formula (I) is a divalent aliphatic, alicyclic or aromatic group. X may contain halogen (e.g. fluorine, chlorine, bromine and iodine) in the group as in the 33rd and 34th examples, and alternatively may contain oxygen in the group as in the 40th to 43rd examples. The divalent aliphatic group denotes by X includes, for example, a straight chain or branched chain group, preferably an alkylene, of 1 to 18 carbon atoms and the like. The divalent alicyclic group denoted by X includes, for example, cyclohexylene,

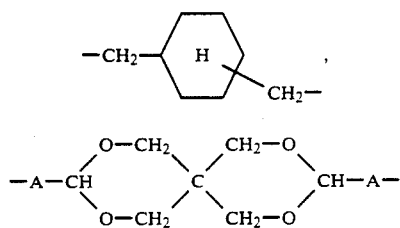

in which Z is a lower alkylene, and the like. The divalent aromatic group denoted by X includes, for example, phenylene unsubstituted or substituted once or twice by lower alkyl (e.g. methyl) or halogen (e.g. chlorine or bromine),

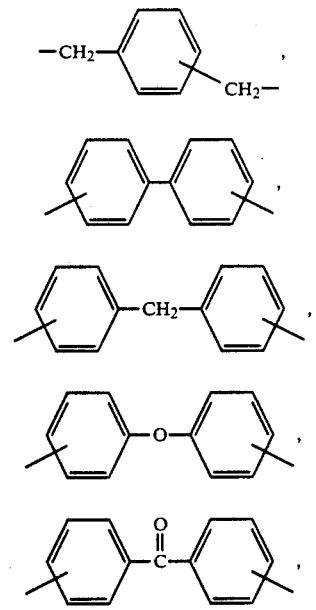

naphthylene and the like. Among them, preferred X is the aliphatic group. More preferably, X is the aliphatic group, particularly the alkylene, of 4 to 12 carbon atoms. Another preferred X is the aromatic group such as phenylene or

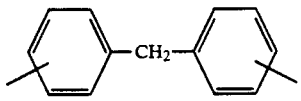

$R^1$ in the formula (I) is hydrogen or an aliphatic, alicyclic or aromatic group. The aliphatic group denoted by $R^1$ includes an alkyl of 1 to 6 carbon atoms and the like, the alicyclic group denoted by $R^1$ includes cyclopentyl, cyclohexyl and the like, and the aromatic group denoted by $R^1$ includes phenyl, tolyl and the like. Among them, preferred $R^1$ is hydrogen, the alkyl, cyclohexyl or phenyl, and more preferred is hydrogen. Alternatively, in case both X and $R^1$ are the aliphatic groups, two nitrogen atoms linking through X can further link through $R^1$ to form a ring composed of X, $R^1$ and two nitrogen atoms as in the above 23rd and 24th examples. Such rings include, for example, piperazine ring and the like.

$R^2$ and $R^3$ in the formula (I) can be the same or different from each other, and are hydrogen or an alkyl of 1 to 12 carbon atoms. Preferably, at least one of $R^2$ and $R^3$ is an alkyl of 1 to 12 carbon atoms, and more preferably they are both methyl Alternatively, R2 and $R^3$ can conjointly link to form, together with carbon atoms bonding to them, rings such as six-membered rings, like the above 12th, 13th, 22nd and 30th examples The dinitrodiamine compound may be added to the thermoplastic resins in the form of each single compound, in admixture with a carrier such as clay which does not affect the properties of the thermoplastic resins, or in admixture with other additives or the base resins. Thus, the compound can be incorporated into the thermoplastic resins in any of these forms.

Amount of the dinitrodiamine compound incorporated into thermoplastic resins is not critical, but if it is too small, the desired properties cannot be sufficiently obtained, and if it is too large, the effect is saturated and this is not economical. Therefore, the amount is usually 0.1-10 parts by weight, more preferably from about 0.3 to about 5 parts by weight, per 100 parts by weight of the thermoplastic resin.

The thermoplastic resins to be stabilized by the present invention include, for example, high-density polyethylene (HD-PE), low-density polyethylene (LD-PE), linear low-density polyethylene (L-LDPE), polypropylene (PP), methylpentene polymer, EEA (ethyleneethyl acrylate copolymer) resin, EVA (ethylene-vinyl acetate copolymer) resin, ionomer resins, polystyrene (PS), poly(α-methylstyrene), AS (acrylonitrile-styrene copolymer) resin, ABS (acrylonitrile-butadiene-styrene copolymer) resin, AAS (special acrylic rubber-acrylonitrile-styrene copolymer) resin, ACS (acrylonitrilechlorinated polystyrene-styrene copolymer) resin, chlorinated polyethylene, poly(vinyl chloride), poly(vinylidene chloride), methacrylic resin, ethylene-vinyl alcohol copolymer resin, fluororesin, polyacetal, polyphenylene ether resin, polyphenylene sulfide resin, polyurethane, polyamide, poly(ethylene terephthalate), poly(butylene terephthalate), polycarbonate, polyallylate, polysulfone, polyether ether ketone, polyether sulfone, aromatic polyester resins and the like.

The present invention is also effective for modified polyolefin resins. The modified polyolefin resins here are those which are obtained by modifying polyolefin resins with an unsaturated compound and are usually obtained by graft polymerizing the polyolefin resins with an unsaturated carboxylic acid, a derivative thereof or a mixture of an unsaturated carboxylic acid or a derivative thereof and an unsaturated aromatic monomer. If necessary, a radical initiator may be present in the modification.

The polyolefin resins include homopolymers and copolymers of various olefins, and examples thereof are low-density polyethylene, linear low-density polyethylene, high-density polyethylene, crystalline polypropylene, crystalline propylene/ethylene random copolymer, crystalline propylene/ethylene block copolymer, polybutene-1, propylene/butene-1 copolymer, poly-4-methylpentene-1, propylene/4-methylpentene-1 copolymer, propylene/ethylene/butene-1 terpolymer, ethylene/vinyl acetate copolymer, ethylene/methyl (meth)acrylate copolymer, ethylene/ethyl (meth)acrylate copolymer, ethylene/butyl (meth)acrylate copolymer, copolymer of ethylene and (meth)acrylic acid or its partial metal salt, ethylene/(meth)acrylic acid/-(meth)-acrylate ester copolymer, ethylene/vinyl alcohol copolymer, ethylene/vinyl acetate/vinyl alcohol copolymer, ethylene/styrene copolymer and the like. These polyolefin resins may be used each alone or in admixture of two or more.

The unsaturated carboxylic acids to be used for modification include, for example, acrylic acid, methacrylic acid, maleic acid, itaconic acid, citraconic acid, bicyclo(2,2,2)octa-5-ene-2,3-dicarboxylic acid, 4-methylcyclohexa-4-ene-1,2-dicarboxylic acid, 1,2,3,4,5,8,9,10-octahydronaphthalene-2,3-dicarboxylic acid, bicyclo(2,2,1}octa-7-ene-2,3,5,6-tetracarboxylic acid, 7-oxabicyclo(2,2,1)hepta-5-ene-2,3-dicarboxylic acid and the like. The derivatives of unsaturated carboxylic acid include acid anhydrides, esters, amides, imides and metal salts and examples thereof are maleic anhydride, itaconic anhidride, citraconic anhydride, monoethyl maleate, monoethyl fumarate, monomethyl itaconate, monomethyl fumarate, dimethylaminoethyl methacrylate, dimethylaminopropyl acrylamide, acrylamide, methacrylamide, maleic acid monoamide, maleic acid diamide, maleic acid N-monoethylamide, maleic acid N,N-diethylamide, maleic acid N-monobutylamide, maleic acid N,N-dibutylamide, fumaric acid monoamide, fumaric acid diamide, fumaric acid N-monoethylamide, fumaric acid N,N-diethylamide, fumaric acid N-monobutylamide, fumaric acid N,N-dibutylamide, maleimide, N-butylmaleimide, N-phenylmaleimide, sodium acrylate, sodium methacrylate, potassium acrylate, potassium methacrylate, and the like. These unsaturated carboxylic acids or derivatives thereof may also be used in admixture of two or more. Generally, maleic anhydride is often used.

As the unsaturated aromatic monomers, styrene is most generally known, but there may also be used o-methylstyrene, p-methylstyrene, m-methylstyrene, α-methylstyrene, vinyltoluene, divinylbenzene, and the like. These may also be used in admixture.

Modification of polyolefin resins can be carried out without using a radical initiator, but in many cases, carried out in the presence of a radical initiator. The radical initiator includes, for example, azo compounds such as 2,2'-azobisisobutyronitrile, 2,2'-azobis(2,4,4-trimethylvaleronitrile) and the like, and various organic peroxides such as methyl ethyl ketone peroxide, cyclohexanone peroxide, 3,5,5-trimethylcyclohexanone peroxide, 2,2-bis(t-butylperoxy)butane, t-butyl hydroperoxide, cumene hydroperoxide, diisopropylbenzene hydroperoxide, 2,5-dimethylhexane-2,5-dihydroperoxide, di-t-butyl peroxide, 1,3-bis(t-butylperoxyisopropyl)benzene, 2,5-dimethyl-2,5-di(t-butylperoxy)hexane, lauroyl peroxide, 3,5,5-trimethylhexanoyl peroxide, benzoyl peroxide, t-butyl peracetate, t-butyl peroxyisobutyrate, t-butyl peroxypivalate, t-butyl peroxy-2-ethylhexanoate, t-butyl peroxy-3,5,5-trimethylhexanoate, t-butyl peroxylaurate, t-butyl peroxybenzoate, di-t-butyl peroxyisophthalate, 2,5-dimethyl-2,5-di(benzoylperoxy)hexane, t-butylperoxymaleic acid, polystyrene peroxide, and the like.

Grafting of the graft monomers such as unsaturated carboxylic acids or derivatives thereof or unsaturated aromatic monomers used therewith on the polyolefin resins can be carried out by various known methods. There are, for example, the following methods: a method which comprises mixing a polyolefin resin, a graft monomer and a radical initiator and melt kneading the mixture in a melt kneading apparatus to carry out the grafting; a method which comprises dissolving a polyolefin resin and a graft monomer in an organic solvent such as xylene, adding a radical initiator to the solvent under nitrogen atmosphere, carrying out the reaction with heating under stirring, and then, subjecting the reaction product to cooling, washing, filtration and drying to obtain a grafted polyolefin resin; a method which comprises irradiating a polyolefin resin with ultraviolet ray or radiation in th presence of a grat monomer; and a method which comprises contacting a polyolefin resin with oxygen or ozone in the presence of a graft monomer. From the economical viewpoint, it is preferred to carry out the graft copolymerization by melt kneading in a melt kneading apparatus.

The thermoplastic resin compositions of the present invention are obtained by adding the dinitrodiamine compound represented by the formula (I) to the above-mentioned thermoplastic resins. In this case, it is of course possible to add generally known other additives. The method for producing the thermoplastic resin composition of the present invention is not critical and there may be used various customary methods. Examples of such methods are as follows: a method of dry-blending a thermoplastic resin with the dinitrodiamine compound and other additives; and a method of adding the dinitrodiamine compound and other additives in the form of solution or suspension to the thermoplastic resin. When the thermoplastic resin is the modified polyolefin resin, it is preferred from industrial viewpoint to employ a method of kneading them in a molten state, although a method of blending them in the state of a solution and evaporating the solvent or precipitating them in a non-solvent is also effective For melt kneading, generally employed kneading apparatuses such as a Banbury mixer, extruders, rolls and various kneaders can be used.

At the kneading, the thermoplastic resin, the dinitrodiamine compound and other optional additives are preferably premixed uniformly by supplying them in any form of powder, pellet or liquid to a mixing apparatus such as a tumbler or a Henschel mixer. In some cases, however, the premixing can be omitted and each component may be separately fed in a constant amount to the kneading apparatus.

When the dinitrodiamine compound is in the form of a powder or a masterbatch mixed with clay or other components, any of the above-mentioned methods can be used. On the other hand, when the dinitrodiamine compound is liquid, it is preferred to previously mix the components by a tumbler or a Henschel mixer, but it is also possible to add the liquid through a piping by a metering pump provided in the kneading apparatus.

The thus kneaded resin composition is molded by various methods such as injection molding, extrusion molding and others. The present invention further includes a method in which molded articles are obtained by dry blending the dinitrodiamine compound at the time of injection molding or extrusion molding and then directly kneading during its operation of melt processing, without the previous kneading.

As also mentioned above, if necessary, the composition of the present invention may further contain one or more of other additives such as phenolic antioxidants, sulfur based antioxidants, phosphorus based antioxidants, ultraviolet absorbers, hindered amine light stabilizers, nucleating agents, lubricants, surface smoothening agents, surface gloss improvers, plasticizers, flame retardants, antistatic agents, pigments, and inorganic fillers. These can be incorporated into the thermoplastic resin in accordance with the above-mentioned methods. Examples of the additives which can be used in the present invention are as follows.

Phenolic Antioxidants

Pentaerythrityl tetrakis[3-(3,5-di-t-butyl-4-hydroxyphenyl)propionate],
Octadecyl 3-(3,5-di-t-butyl-4-hydroxyphenyl)-propionate,
Triethylene glycol bis[3-(3-t-butyl-4-hydroxy-5-methylphenyl)propionate],
3,9-Bis[2-{3-(3-t-butyl-4-hydroxy-5-methylphenyl)-propionyloxy}-1,1-dimethylethyl]-2,4,8,10-tetraoxaspiro[5.5]undecane,
Tris(3,5-di-t-butyl-4-hydroxybenzyl) isocyanurate,
1,3,5-Trimethyl-2,4,6-tris(3,5-di-t-butyl-4-hydroxybenzyl)benzene,
2,4-Bis(n-octylthio)-6-(3,5-di-t-butyl-4-hydroxyanilino)-1,3,5-triazine,
1,6-Hexanediol bis[3-(3,5-di-t-butyl-4-hydroxyphenyl)propionate],
2,2'-Thiodiethylene bis[3-(3,5-di-t-butyl-4-hydroxyphenyl)propionate],
Tris(4-t-butyl-3-hydroxy-2,6-dimethylbenzyl) isocyanurate,
2-t-Butyl-6-(3-t-butyl-2-hydroxy-5-methylbenzyl)-4-methylphenyl acrylate,
2,4-di-t-amyl-6-[1-(3,5-di-t-amyl-2-hydroxyphenyl)ethyl]phenyl acrylate.

Sulfur Based Antioxidants

Dilauryl 3,3'-thiodipropionate,
Dimyristyl 3,3'-thiodipropionate,
Distearyl 3,3'-thiodipropionate,
Pentaerythrityl tetrakis(β-laurylthiopropionate).

Phosphorus Based Antioxidants

Tris(nonylphenyl) phosphite,
Tris(2,4-di-t-butylphenyl) phosphite,
Tetrakis(2,4-di-t-butylphenyl) 4,4'-biphenylene diphosphonite,
Bis(2,4-di-t-butylphenyl) pentaerythritol diphosphite,
Distearyl pentaerythritol diphosphite.

Ultraviolet Absorbers

2-Hydroxy-4-methoxybenzophenone,
2-Hydroxy-4-octoxybenzophenone,
2,2'-Dihydroxy-4-methoxybenzophenone,
Bis(5-benzoyl-4-hydroxy-2-methoxyphenyl)-methane,
2,2',4,4'-Tetrahydroxybenzophenone,
2-(2-Hydroxy-5-methylphenyl)benzotriazole,
2-[2-Hydroxy-3-(3,4,5,6-tetrahydrophthalimidomethyl)-5-methylphenyl]benzotriazole,
2-(3-t-Butyl-2-hydroxy-5-methylphenyl)-5-chlorobenzotriazole,
2-(3,5-Di-t-butyl-2-hydroxyphenyl)-benzotriazole,
2-(2-Hydroxy-5-t-octylphenyl)benzotriazole,
2-(3,5-Di-t-amyl-2-hydroxyphenyl)benzotriazole,
2-[2-Hydroxy-3,5-bis(α,α-dimethylbenzyl)-phenyl]-2H-benzotriazole,
2-(3,5-Di-t-butyl-2-hydroxyphenyl)-5-chlorobenzotriazole,
2,2'-Methylenebis[6-(2H-benzotriazole-2-yl)-4-(1,1,3,3-tetramethylbutyl)phenol],
A condensate of poly(3-11)(ethylene glycol) with methyl 3-[3-(2H-benzotriazole-2-yl)-5-t-butyl-4-hydroxyphenyl]propionate,
2-Ethylhexyl 3-[3-t-butyl-5-(5-chloro-2H-benzotriazole-2-yl)-4-hydroxyphenyl]propionate,
Octyl 3-[3-t-butyl-5-(5-chloro-2H-benzo-triazole-2-yl)-4-hydroxyphenyl]propionate,
Methyl 3-[3-t-butyl-5-(5-chloro-2H-benzo-triazole-2-yl)-4-hydroxyphenyl]propionate,
3-[3-t-Butyl-5-(5-chloro-2H-benzotriazole-2-yl)-4-hydroxyphenyl]propionate,
2,2'-Methylenebis[4-t-butyl-6-(2H-benzotriazole-2-yl)phenol].

Hindered Amine Light Stabilizers

Bis(2,2,6,6-tetramethyl-4-piperidyl) sebacate,
A polycondensate of dimethyl succinate with 1-(2-hydroxyethyl)-4-hydroxy-2,2,6,6-tetramethylpiperidine,
Poly[(6-morpholino-1,3,5-triazine-2,4-diyl){(2,2,6,6-tetramethyl-4-piperidyl)imino}hexamethylene{(2,2,6,6-tetramethyl-4-piperidyl)imino}],
Bis(1,2,2,6,6-pentamethyl-4-piperidyl) 2-(3,5-di-t-butyl-4-hydroxybenzyl)-2-butylmalonate,
4-[3-(3,5-Di-t-butyl-4-hydroxyphenyl)-propionyloxy]-1-[2-[3-(3,5-di-t-butyl-4-hydroxyphenyl)propionyloxy]ethyl]-2,2,6,6-tetramethylpiperidine,
Bis(1,2,2,6,6-pentamethyl-4-piperidyl) decanedioate,
Tetrakis(2,2,6,6-tetramethyl-4-piperidyl) 1,2,3,4-butanetetracarboxylate,
Poly[{6-(1,1,3,3-tetramethylbutyl)imino-1,3,5-triazine-2,4-dinyl}{(2,2,6,6-tetramethyl-4-piperidyl)-imino} hexamethylene {(2,2,6,6-tetramethyl-4-piperidyl)-imino}],
A mixed ester of 1,2,3,4-butanetetracarboxylic acid with 1,2,2,6,6-pentamethyl-4-piperidinol and 1-tridecanol,
A mixed ester of 1,2,3,4-butanetetracarboxylic acid with 2,2,6,6-tetramethyl-4-piperidinol and 1-tridecanol,
A mixed ester of 1,2,3,4-butanetetracarboxylic acid with 1,2,2,6,6-pentamethyl-4-piperidinol and 3,9-bis(2- hydroxy-1,1-dimethylethyl)-2,4,8,10-tetraoxaspiro[5.-5]undecane,

A mixed ester of 1,2,3,4-butanetetracarboxylic acid with 2,2,6,6-tetramethyl-4-piperidinol and 3,9-bis(2-hydroxy-1,1-dimethylethyl)-2,4,8,10-tetraoxaspiro[5.-5]undecane, A polycondensate of N,N'-bis(2,2,6,6-tetramethyl-4-piperidyl)hexamethylenediamine with 1,2-dibromoethane, 2-Methyl-2-(2,2,6,6-tetramethyl-4-piperidylamino)-N-(2,2,6,6-tetramethyl-4-piperidyl)propionamide, N,N+,4,7-tetrakis[4,6-bis{N-butyl-N-(2,2,6,6-tetramethyl-4-piperidyl)amino}-1,3,5-triazine-2-yl]-4,7-diazadecane-1,10-diamine, N,N',4-tris[4,6-bis{N-butyl-N-(2,2,6,6-tetramethyl-4-piperidyl)amino}-1,3,5-triazine-2-yl]-4,7-diazadecane-1,10-diamine, Bis(1-acryloyl-2,2,6,6-tetramethyl-4-piperidyl) 2,2-bis(3,5-di-t-butyl-4-hydroxybenzyl)-malonate, N,N',4,7-tetrakis[4,6-bis{N-butyl-N-(1,2,2,6,6-pentamethyl-4-piperidyl)amino}-1,3,5-triazine-2-yl]-4,7-diazadecane-1,10-diamine, N,N',4-tris[4,6-bis{N-butyl-N-(1,2,2,6,6-pentamethyl-4-piperidyl)amino}-1,3,5-triazine-2-yl]-4,7-diazadecane-1,10-diamine, Bis(2,2,6,6-tetramethyl-4-piperidyl) succinate,
2,2,6,6-Tetramethyl-4-piperidyl methacrylate,
1,2,2,6,6-Pentamethyl-4-piperidyl methacrylate,
Tetrakis(1,2,2,6,6-pentamethyl-4-piperidyl) 1,2,3,4-butanetetracarboxylate.

According to the present invention, a thermoplastic resin composition excellent in thermal processing stability in molding at high temperatures is obtained by adding a specific dinitrodiamine compound to a thermoplastic resin. Therefore, this thermoplastic resin composition is useful especially in the fields which require molding at high temperatures.

Furthermore, when a modified polyolefin resin is used as the thermoplastic resin, there is obtained a modified polyolefin resin composition excellent in mechanical properties, especially in impact strength. This modified polyolefin resin composition can be used in the fields which require adhesion and impact resistance, for example, in the fields of film, sheet and molded articles.

The present invention will be explained by the following examples, but these are mere exemplification and the present invention is not limited to these examples as far as the gist of the present invention is not deviated. In these examples, % and part are by weight unless otherwise notified.

Thermal processing stabilizers used in Examples 1-14 and Comparative Examples 1-8 are shown below and are indicated by the respective marks.

A:N,N'-bis(2-methyl-2-nitropropyl)-1,4-diaminobenzene

B:N,N'-bis(2-methyl-2-nitropropyl)-4,4'-diaminodiphenylmethane

C:N,N'-bis(2-methyl-2-nitrooctyl)-1,4-diaminobenzene

D:N,N'-bis(2-methyl-2-nitropropyl)-1,6-diaminohexane

E:N,N'-bis(2-methyl-2-nitropropyl)-1,18-diaminooctadecane

F:N,N'-bis(2-methyl-2-nitropropyl)piperazine

AO:Octadecyl 3-(3,5-di-t-butyl-4-hydroxyphenyl)-propionate

The properties in Examples 1-14 and Comparative Examples 1-8 were measured by the following methods.

(1) Melt Flow Rate

This was measured by the method specified in JIS K 6758 at 260° C. under a load of 2.16 kg.

(2) Intrinsic Viscosity

Solution viscosity was measured by Ubbelohde's viscometer. The intrinsic viscosity was determined by the calculation method mentioned in "Encyclopedia of Polymer Science and Engineering", 2nd Ed., Vol. 14, published in 1988 by John Wiley & Sons, Inc., page 464. That is, solution viscosity was measured at the three points of 0.1, 0.2 and 0.5 g/dl in concentration and reduced viscosity was determined at respective concentrations. The intrinsic viscosity was determined by extrapolation method comprising plotting the reduced viscosity against the concentration and extrapolating the concentration at 0.

EXAMPLES 1-8 AND COMPARATIVE EXAMPLES 1 AND 2

Polypropylene was prepared by the slurry polymerization process mentioned in U.S. Pat. No. 4,554,264. This polypropylene had a melt flow rate of 14 g/10 min, an intrinsic viscosity of 2.45 dl/g measured in tetralin solvent at 135° C., a cold xylene soluble portion of 2.9% at 20° C., a boiling heptane soluble portion of 6.7%, and an isotactic pentad rate of boiling heptane insoluble portion of 0.952.

The thermal processing stabilizer was added in the amount as shown in Table 1 to 100 parts of this polypropylene and the mixture was kneaded at 240° C. and 70 rpm for 5 minutes by a Laboplastomill (manufactured by Toyo Seiki Co.). Melt flow rate of the resulting composition was measured by a melt indexer (manufactured by Takara Kogyo Co.) and the results are shown in Table 1. Since polypropylene undergoes breakage of molecules due to deterioration, the lower melt flow rate means the higher thermal processing stability.

TABLE 1

| (Resin: Polypropylene) | | | |
|---|---|---|---|
| | Thermal processing stabilizer | | |
| | Kind | Addition amount (part) | Melt flow rate (g/10 min) |
| Example 1 | A | 1 | 10 |
| Example 2 | A | 2 | 8 |
| Example 3 | B | 2 | 12 |
| Example 4 | C | 2 | 11 |
| Example 5 | D | 1 | 10 |
| Example 6 | D | 2 | 8 |
| Example 7 | E | 2 | 9 |
| Example 8 | F | 2 | 9 |
| Comparative Example 1 | AO | 2 | 21 |
| Comparative Example 2 | None | — | 42 |

EXAMPLES 9 AND 10 AND COMPARATIVE EXAMPLES 3 AND 4

A polystyrene having a melt flow rate of 17 g/10 min was used. The thermal processing stabilizer as shown in Table 2 was added in the amount as shown in Table 2 to 100 parts of this polystyrene and thermal processing stability was evaluated in the same manner as in Examples 1-8. The results are shown in Table 2.

EXAMPLES 11 AND 12 AND COMPARATIVE EXAMPLES 5 AND 6

Poly-2,6-dimethylphenylene ether having an intrinsic viscosity of 0.3 dl/g measured in chloroform at 25° C. and a melt flow rate of 1.6 g/10 min was used. The thermal processing stabilizer as shown in Table 2 was added in the amount as shown in Table 2 to 100 parts of the above polyphenylene ether and thermal processing stability was evaluated in the same manner as in Examples 1-8. The results are shown in Table 2.

EXAMPLES 13 AND 14 AND COMPARATIVE EXAMPLES 7 AND 8

The polystyrene used in Examples 9 and 10 and polyphenylene ether used in Examples 11 and 12 were blended at a weight ratio of 70/30 and were uniformly mixed by a Henschel mixer. Then, the mixture was melt kneaded by a twin-screw extruder, TEX 44 SS-30BW-2V, manufactured by Nippon Seikosho K.K. under the condition of 260° C. and an average residence time of 1.5 minute to prepare a polyphenylene ether composition having a melt flow rate of 3.8 g/10 min.

The thermal processing stabilizer as shown in Table 2 was added in the amount as shown in Table 2 to 100 parts of the above polyphenylene ether and thermal processing stability was evaluated in the same manner as in Examples 1-8. The results are shown in Table 2.

sponding to the substituted benzene ring which appeared therein.

The composition was prepared by the following process in the following examples and comparative examples. That is, given amounts of respective components were weighed and uniformly premixed by a Henschel mixer and the mixture was extruded by a continuous twin-screw extruder (TEX 44 SS-30BW-2V manufactured by Nippon Seikosho K. K.) at an extrusion amount of 30 kg/hour, a resin temperature of 240° C., a screw revolution of 350/min and under venting suction. The screws were triple flighted rotor and kneading disc and these were arranged in a zone next to the first feed opening and a zone next to the second feed opening, respectively.

The properties in the following Reference Example 1, Examples 15-18, and Comparative Examples 9-10 were measured by the following methods.

(3) Melt flow rate:

This was measured by the method specified in JIS K 6758 at 230° C. and under a load of 2.16 kg.

(4) Tensile test:

Tensile yield strength and tensile elongation were measured in accordance with the method specified in ASTM D 638 using a test piece of 3.2 mm thick. Measuring temperature was 23° C.

(5) Izod impact test:

Impact strength was measured in accordance with the method specified in JIS K 7110 using a test piece of 3.2 mm thick with notch. Measuring temperature was 23° C.

TABLE 2

| | Thermoplastic resin | Thermal processing stabilizer Kind | Addition amount (part) | Melt flow rate (g/10 min) |
|---|---|---|---|---|
| Example 9 | Polystyrene | A | 1 | 38 |
| Example 10 | | D | 1 | 36 |
| Comparative Example 3 | | AO | 1 | 42 |
| Comparative Example 4 | | None | — | 85 |
| Example 11 | Polyphenylene ether | A | 1 | 1.6 |
| Example 12 | | D | 1 | 1.6 |
| Comparative Example 5 | | AO | 1 | 2.2 |
| Comparative Example 6 | | None | — | 2.5 |
| Example 13 | Polyphenylene ether/polystyrene | A | 1 | 3.8 |
| Example 14 | | D | 1 | 3.6 |
| Comparative Example 7 | | AO | 1 | 4.5 |
| Comparative Example 8 | | None | — | 5.0 |

The following examples show stabilization of modified polypropylene. In these examples, amounts of maleic anhydride and that of styrene added t the modified polypropylene were measured by the following methods.

(1) Amount of maleic anhydride added:

A small amount of sample was dissolved in heated xylene and purified by precipitation with anhydrous acetone and was again dissolved in xylene. Then, amount of maleic anhydride added was determined by titration with a methanolic NaOH solution at 110°-120° C. using phenolphthalein as an indicator.

(2) Amount of styrene added:

IR spectrum of a sample purified in the same manner as above was measured and amount of styrene added was determined from intensity of absorption peak corre- The test piece for evaluation of the above properties was made by injection molding under the following conditions unless otherwise notified. That is, the composition was dried at 120° C. for 2 hours by a hot air dryer and then injection molded by an injection molding machine, IS 150 E-V, manufactured by Toshiba Machine Co., Ltd. under a molding temperature of 235° C., a mold cooling temperature of 70° C., an injection time of 15 seconds, and a cooling time of 30 seconds.

REFERENCE EXAMPLE 1: PREPARATION OF MODIFIED POLYPROPYLENE

Propylene homopolymer (PP-1) prepared by the slurry polymerization process mentioned in U.S. Pat. No. 4,554,264 had a melt flow rate of 1.3 g/10 min, an intrinsic viscosity of 2.45 dl/g measured in tetralin solvent at 135° C., a cold xylene soluble portion of 2.9% at 20° C., a boiling heptane soluble portion of 6.7%, and an isotactic pentad rate of boiling heptane insoluble portion of 0.955. This homopolymer was modified by the following method.

That is, to 100 parts of the above propylene homopolymer were added 1.0 part of maleic anhydride, 0.5 part of styrene, 0.6 part of a radical initiator comprising propylene homopolymer on which 8% of 1,3-bis(t-butylperoxyisopropyl)benzene (SANPEROX® TY1.3 manufactured by Sanken Kako Co.) was supported, and 0.1 part of IRGANOX® 1010 (pentaerythrityltetrakis [3-3,5-di-t-butyl-4-hydroxyphenyl)propionate] manufactured by Ciba-Geigy Corp.) as a stabilizer. These were uniformly mixed by a Henschel mixer and melt kneaded by a twin-screw extruder, TEX 44 SS-30BW-2V, manufactured by Nippon Seikosho K. K. under a temperature of 220° C. and an average residence time of 1.5 minute to prepare a polypropylene modified by maleic anhydride and styrene containing 0.15% of malein anhydride added and 0.07% of styrene added and having a melt flow rate of 21 g/10 min. This modified polypropylene is referred to as "MS-PP-1".

A polypropylene modified by maleic anhydride containing 0.08% of maleic anhydride added and having a melt flow rate of 36 g/10 min was prepared in the same manner as above except that styrene was not used. This modified polypropylene is referred to as "M-PP-1".

REFERENCE EXAMPLE 2: DINITRODIAMINE COMPOUND

N,N'-bis(2-methyl-2-nitropropyl)-1,6-diaminohexane which was liquid at a room temperature was used as a dinitrodiamine compound. This compound is hereinafter referred to as "D".

75 parts of PP-1 and 25 parts of compound D were uniformly mixed by a Henschel mixer to prepare a masterbatch of compound D. This mixture is hereinafter referred to as "D-MB".

EXAMPLES 15-17 AND COMPARATIVE EXAMPLES 9-10

As shown in Table 3, the modified polypropylene and the dinitrodiamine compound were blended. The blending was carried out in accordance with the above-mentioned method by feeding the modified polypropylene from the first feed opening and the compound D in the form of liquid from the second feed opening by using a micro pump, KHD-W-294, manufactured by Kyowa Seimitsu Co. The resulting composition was injection molded to prepare test pieces under the conditions as mentioned above, and the test pieces were subjected to the measurement of properties by the above-mentioned methods.

The results of measurement of properties are shown in Table 3. It can be seen that the compositions of Examples 15-17 which contained the dinitrodiamine compound according to the present invention were improved in melt flow rate and impact strength as compared with those of Comparative Example 9 or 10 which contained no dinitrodiamine compound.

EXAMPLE 18

A modified polypropylene resin composition was prepared in the same manner as in Example 17 except that D-MB was used as the dinitrodiamine compound at the blending ratio as shown in Table 3 and was fed from the second feed opening. The resulting composition was injection molded to prepare test pieces under the conditions as mentioned above except for the molding temperature of 240° C. The test pieces were subjected to the measurement of properties by the above-mentioned methods.

The results of measurement of the properties are shown in Table 3.

TABLE 3

|  | Blending ratio (part) | | Melt flow rate (g/10 min) | Tensile characteristics | | Izod impact strength (kg-cm/cm) |
|  |  |  |  | Yield strength (kg/cm$^2$) | Elongation at breakage (%) |  |
| --- | --- | --- | --- | --- | --- | --- |
| Example 15 | M-PP-1 100 | D 0.5 | 16 | 310 | 75 | 3.3 |
| Example 16 | M-PP-1 100 | D 1.0 | 11 | 320 | 85 | 3.5 |
| Comparative Example 9 | M-PP-1 100 | — | 36 | 300 | 44 | 2.2 |
| Example 17 | MS-PP-1 100 | D 1.0 | 10 | 330 | 95 | 3.6 |
| Example 18 | MS-PP-1 100 | D-MB 4.0 | 10 | 330 | 98 | 3.7 |
| Comparative Example 10 | MS-PP-1 100 | — | 21 | 310 | 52 | 2.4 |

What is claimed is:

1. A thermoplastic resin composition comprising
  a modified polypropylene resin selected from the group consisting of crystalline polypropylene, crystalline propylene/ethylene random copolymer and crystalline propylene/ethylene block copolymer, each of which is modified with an unsaturated compound; and
  a dinitrodiamine compound represented by the following formula:

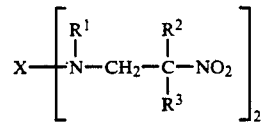

wherein X is a divalent aliphatic, alicyclic or aromatic group which may contain halogen or oxygen in the group, $R^1$ is hydrogen or an aliphatic, alicyclic or aromatic group, provided that two nitrogen atoms linking through X may further link through $R^1$ when both X and $R^1$ are the aliphatic groups, and $R^2$ and $R^3$ independently of one another are each hydrogen or an alkyl of 1 to 12 carbon atoms, provided that $R^2$ and $R^3$ may conjointly form a ring;
  said dinitrodiamine compound being present in an effective amount for improviding the thermal processing stability and mechanical properties of said modified polypropylene resin.

2. The composition according to claim 1, wherein said modified polypropylene resin is obtained by graft polymerization of a polypropylene resin with an unsaturated carboxylic acid or its anhydride or with a mixture of an unsaturated carboxylic acid or its anhydride and an unsaturated aromatic monomer.

3. The composition according to claim 2, wherein said modified polypropylene resin is a polypropylene modified by maleic anhydride.

4. The composition according to claim 2, wherein said modified polypropylene resin is a polypropylene modified by maleic anhydride and styrene.

5. The composition according to claim 1, wherein X in the formula of the dinitrodiamine compound is an aliphatic group of 4 to 12 carbon atoms.

6. The composition according to claim 1, wherein X in the formula of the dinitrodiamine compound is an aromatic group selected from phenylene and

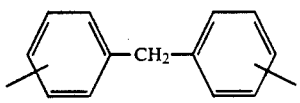

7. The composition according to claim 1, wherein said dinitrodiamine compound is present in an amount of 0.1 to 10 parts by weight per 100 parts by weight of the polypropylene resin.

8. The composition according to claim 1, wherein said dinitrodiamine compound is N,N'-bis(2-methyl-2-nitropropyl)-1,4-diaminobenzene, N,N'-bis(2-methyl-2-nitropropyl)-4,4'-diaminodiphenylmethane, N,N'-bis(2-methyl-2-nitrooctyl)-1,4-diaminobenzene, N,N'-bis(2-methyl-2-nitropropyl)-1,6-diaminohexane, N,N'-bis(2-methyl-2-nitropropyl)-1,18-diaminooctadecane or N,N'-bis(2-methyl-2-nitropropyl)piperadine.

9. The composition according to claim 1, wherein said dinitrodiamine compound is N,N'-bis)2-methyl-2-nitropropyl)-1,6-diaminohexane.

10. A method for improviding mechanical properties and thermal processing stability of a modified polypropylene resin which comprises incorporating into the modified polypropylene resin an effective amount of a dinitrodiamine compound represented by the following formula:

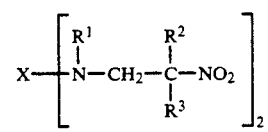

wherein X is a divalent aliphatic, alicyclic or aromatic group which may contain halogen or oxygen in the group, $R^1$ is hydrogen or an aliphatic, alicyclic or aromatic group, provided that two nitrogen atoms linking through X may further link through $R^1$ when both X and $R^1$ are the aliphatic groups, and $R^2$ and $R^3$ independently of one another are each hydrogen or an alkyl of 1 to 12 carbon atoms, provided that $R^2$ and $R^3$ may conjointly form a ring, said modified polypropylene resin being selected from the group consisting of crystalline polypropylene, crystalline propylene/ethylene random copolymer and crystalline propylene/ethylene block copolymer, each of which is modified with an unsaturated compound, thereby improving the thermal processing stability of said modified polypropylene resin as well as improviding mechanical properties of said modified polypropylene resin.

* * * * *